June 8, 1965   E. ESCH   3,187,438
MICROMETER HEAD
Filed Oct. 3, 1961   2 Sheets-Sheet 1
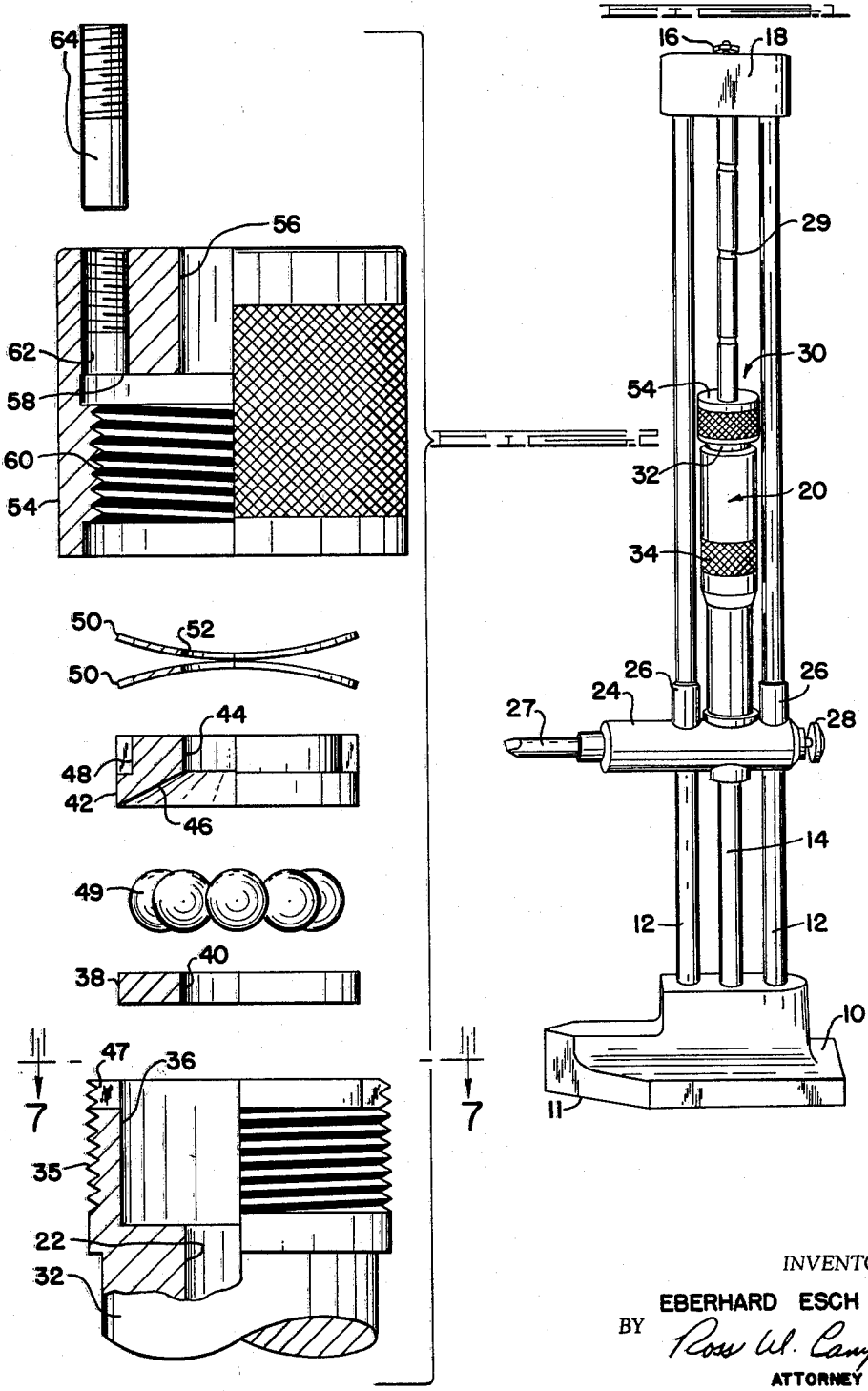
INVENTOR.
EBERHARD ESCH
BY Ross W. Campbell
ATTORNEY June 8, 1965  E. ESCH  3,187,438
MICROMETER HEAD
Filed Oct. 3, 1961  2 Sheets-Sheet 2
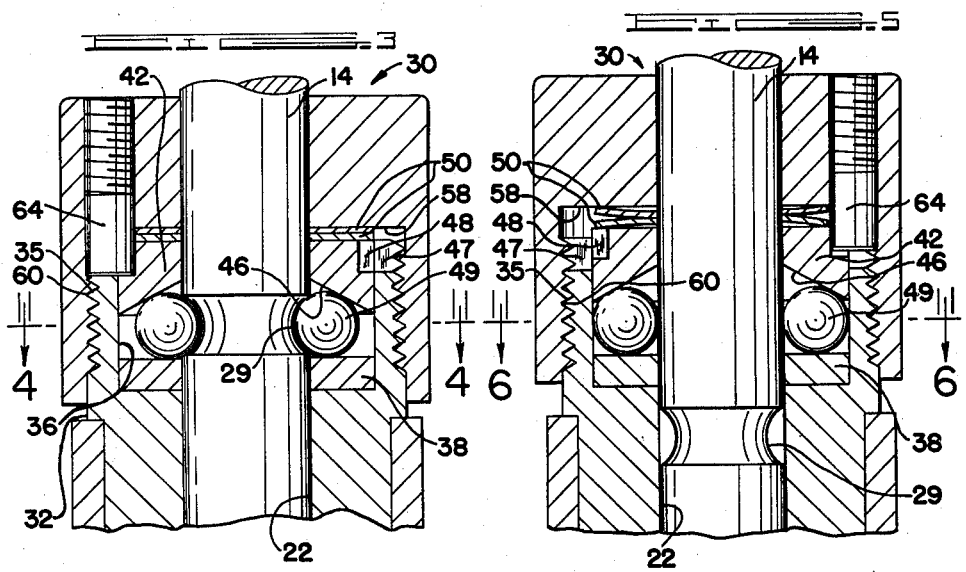
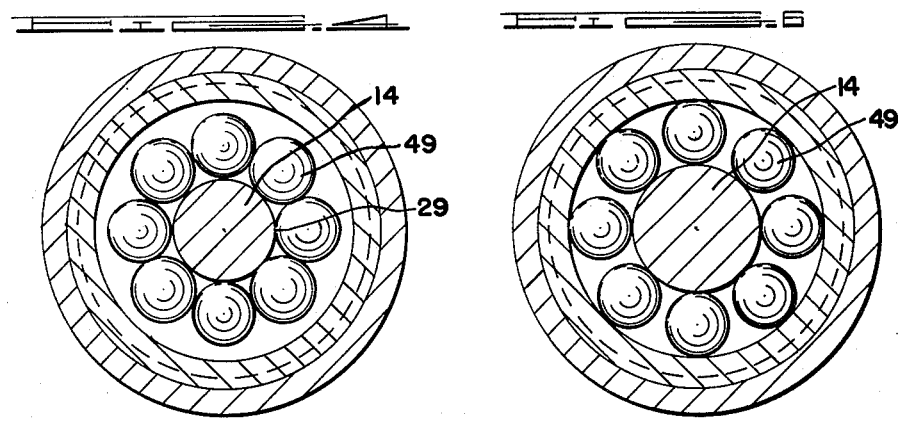
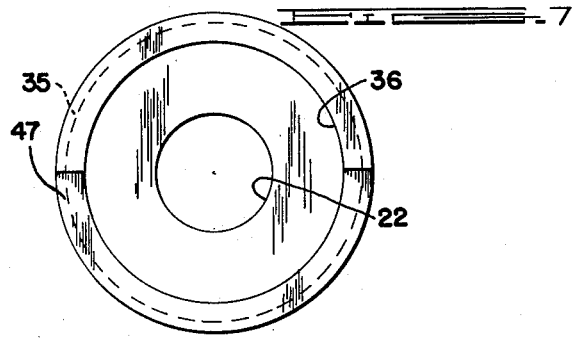
INVENTOR.
EBERHARD ESCH
BY
Ross W. Campbell
ATTORNEY 3,187,438
MICROMETER HEAD
Eberhard Esch, 2454 Packard Road, Ann Arbor, Mich.
Filed Oct. 3, 1961, Ser. No. 142,610
2 Claims. (Cl. 33—170)

This invention relates to instruments for precise measuring and more particularly to adjustable stop means for a micrometer gauge.

Briefly, one form of the present invention includes a base having a pair of upright parallel guide rods, an upright standard rod intermediate the guide rods, the standard rod having a plurality of equally spaced circumferential grooves therein, means connecting the guide rods and standard rod at the upper ends thereof, a micrometer surrounding and longitudinally slidable upon the standard rod, scriber means connected to the micrometer, and a novel micrometer head. The micrometer head includes, briefly, a ball race housing connected to the upper end of the micrometer and bearing external threads, an annular thrust washer surrounding the standard rod and disposed to seat within the housing, an annular ball race, having an inwardly-sloped race face, surrounding the standard rod, a plurality of ball bearings disposed within the housing between the washer and race and surrounding the standard rod, annular spring means surrounding the standard rod and urging the sloped face of the race against the ball bearings and the ball bearings in turn against the thrust washer, and an internally threaded locking cap nut surroundingly and threadably engaging the housing to retain the thrust bearing, ball bearings, and ball race within the housing and to provide means for applying or releasing pressure of the spring means against the ball race.

The face of the ball race which is in contact with the ball bearings is sloped inwardly and away from the thrust washer so that, when the spring leaves are compressed against the ball race by manual tightening of the locking cap nut to the housing, all of the balls are simultaneously urged radially inward by the sloped race face to engage a circumferential groove of the standard rod disposed to receive the balls. When pressure on the spring leaves is released by sufficiently unthreading the locking cap nut from the housing, the balls are free to be disengaged from the circumferential groove of the standard rod by the arcuate sidewall of the groove and to move radially outward within the housing, thereby permitting the micrometer head and micrometer to be slidably moved upward or downward along the standard rod.

A screw threadably engaged with the locking cap nut extends downwardly into a curved slot in the upper end of the ball race housing, the ends of the slot serving to limit rotary motion of the screw and hence of the locking cap nut so as to prevent accidental disassembly of the micrometer head when the locking cap nut is partially unscrewed from the housing to relieve pressure of the spring leaves upon the race.

An object of the present invention is to provide improved means for accurately and releasably engaging a micrometer with a selected groove of a standard rod having a plurality of spaced circumferential grooves therein. Another object of the invention is to provide means for releasably engaging a micrometer with a circumferential groove of a standard rod at a plurality of circumferential points within the groove. Still a further object is to provide in a micrometer head having a plurality of ball bearings disposed to surround and, in response to manual rotation of a locking cap nut, to releasably engage a circumferential groove in a standard rod, means for limiting rotary movement of the locking cap nut to prevent accidental disassembly of the micrometer head.

Other objects of the invention, and the various features of novelty, will become apparent to those skilled in the art upon reference to the accompanying drawings and specification wherein a preferred embodiment of the invention is disclosed.

A preferred embodiment of the invention is illustrated in the accompanying drawings, forming a part of this specification, in which like characters are employed to designate like parts throughout the same, and wherein:

FIGURE 1 is a side view of a micrometer head adapted for use in a height gauge.

FIGURE 2 is an expanded view of a micrometer head partially in section.

FIGURE 3 is a longitudinal sectional view of a micrometer head engaged with a circumferential groove of a standard rod.

FIGURE 4 is a sectional view taken along line 4—4 of FIGURE 3.

FIGURE 5 is a longitudinal sectional view of a micrometer head disengaged from a circumferential groove of a standard rod.

FIGURE 6 is a sectional view taken along line 6—6 of FIGURE 5.

FIGURE 7 is a view taken along line 7—7 of FIGURE 2.

In the preferred embodiment of the present invention, a base 10, having a flat lower surface 11 thereon, supports a pair of upright parallel guide rods 12, 12 and an upright standard rod 14 in spaced, parallel relation therebetween. A crossbar 18 retains the upper ends of rods 12, 12 and of rod 14. Rods 12, 12 are connected to crossbar 18 by a pair of socket cap screws (not shown) directed downwardly into the upper ends of said rods, respectively. A pair of thrust bearings (not shown) is provided in crossbar 18 and base 10, respectively, to retain rod 14 and to permit rotation thereof about its longitudinal axis. A set screw 16 connected to the upper thrust bearing and a second set screw (not shown) in base 10 provides means for adjusting rod 14 longitudinally.

A graduated micrometer generally indicated by the number 20 in FIGURE 1, having a longitudinal central bore 22 therein, surrounds standard rod 14 and is longitudinally slidable thereon. A carrier member 24 is connected about the lower end of micrometer 20 transversely thereto and has a pair of apertures (not shown) therein, and a pair of sleeves 26, 26 in extension of said apertures, slidably surrounding rods 12, 12, respectively. A chisel-pointed scriber 27 is connected to carrier member 24 in such a manner that the chisel point of the scriber is maintained parallel to the lower surface 11 of base 10. A thumbscrew 28 is threadedly engaged within an aperture (not shown) in carrier member 24 to releasably engage and bind the carrier to one of rods 12, 12, thereby preventing accidental movement of the micrometer.

Standard rod 14 bears a plurality of equally spaced circumferential grooves 29 each having an arcuate cross section. The space between each pair of grooves 29 may be of any convenient uniform distance. I have found it convenient to space grooves 29 precisely twenty-five millimeters apart where micrometer 20 is calibrated in metric units. Where micrometer 20 is calibrated in fractions of an inch, grooves 29 may be spaced precisely one inch apart. In manufacture, the lowest groove 29 of rod 14 is disposed so that the chisel point of scriber 27 will be disposed a convenient predetermined exact unit of distance, say two inches, where micrometer 20 is graduated in units of fractions of an inch, above the flat lower surface 11 of base 10 when the micrometer is set to a zero reading and the groove utilized to prevent sliding movement of the micrometer as hereinafter described.

A novel micrometer head generally indicated by the number 30 is provided at the upper end of micrometer 20. Micrometer 20 includes a micrometer screw 32 and a micrometer thimble 34. The upper end of screw 32 is formed to extend beyond the upper end of thimble 34 and is provided with external threads 35 and a counterbore 36 coaxial with bore 22 to form a housing.

A circular annular thrust washer 38, having an external diameter such as to slidingly fit within counterbore 36, rests within the counterbore and has a circular central aperture 40 of such diameter as to slidingly surround standard rod 14. A circular annular ball race 42 is provided having an external diameter such as to slidingly fit within counterbore 36 and having a circular central bore 44 of such diameter as to form a sliding fit with standard rod 14. The face 46 of race 42 is formed to slope uniformly inwardly to bore 44 in the direction away from washer 38 with which the race face cooperates. An arcuate slot 47 is provided in the end of screw 32 and counterbore 36, as best shown in FIGURES 2 and 7, and extends approximately 180 degrees therearound, for a novel purpose hereinafter described. A second arcuate slot 48 is similarly provided in the face and outer edge of race 42 opposite to face 46, and extends along the perimeter of the race a distance at least equal to the 180 degree extent of slot 47, for clearance. If desired, slot 48 may extend 360 degrees about the entire perimeter of race 42.

A plurality of ball bearings 49 is disposed within counterbore 36, surrounding rod 14, and between washer 38 and face 46 of race 42. The diameter and number of balls 49 are selected to be such that, when the micrometer head is assembled and surrounds rod 14, and the balls engage a groove 29, the balls will each be in contact with the least diameter of groove 29, as best shown in FIGURE 4. Each groove 29 is formed to have an arcuate cross section such as to receive balls 49 in circumferential arrangement within the goove and with each ball in contact with the groove along a complete arcuate line of common contact therewith when the balls are urged radially into the groove.

A pair of opposingly disposed circular annular leaf springs 50, 50, each having a central circular aperture 52 of sufficient diameter to slidingly surround standard rod 14 without binding when the springs are compressed, uncompressed, or in transition from one state to the other, is provided to releasably urge race 42 against balls 49.

A locking cap nut 54, having a central bore 56 in the upper end thereof of diameter such as to slidingly surround standard rod 14, and having a counterbore 58, bears a set of internal threads 60 in the central portion of the counterbore to threadably engage threads 35 of screw 32. When cap nut 54 is completely engaged with the upper end of screw 32 by threads 35 and 60, the micrometer head is in locked position. Counterbore 58 of cap nut 54 is formed to have a sufficient depth so that leaf springs 50, 50 are both completely compressed against each other and between the upper face of race 42 and the seat of the counterbore when the micrometer head is in locked position. Counterbore 36 of screw 32 is formed to have a sufficient depth to receive washer 38, balls 49, and race 42.

An internally threaded eccentric longitudinal bore 62 is formed in the upper end of cap nut 54 near the perimeter thereof. A restricter screw 64, threaded at its upper end, is threadably engaged within bore 62 and extends downwardly into slot 47 and counterbore 58, as best shown in FIGURES 3 and 5. When micrometer head 30 is assembled and screw 64 is completely screwed into bore 62, the lower end of the screw extends downwardly into arcuate slot 48 in the upper face of ball race 42 for clearance between the race and screw, as well as extending into slot 47 of screw 32. Rotary movement of cap nut 54 is limited to 180 degrees of rotation by striking of screw 64 against the ends of slot 47 when the cap nut with screw 64 therein is rotated to partially disengage the cap nut from the upper end of screw 32. Cap nut 54 cannot then be further unscrewed from engagement with the upper end of screw 32 unless the lower end of screw 64 is removed from engagement with the slot by partially unscrewing it from bore 62. Accidental disassembly of micrometer head 30 is thus prevented.

The pitch of threads 35 and 60 is selected so that such 180 degree of rotation of cap nut 54 to partially disengage it from screw 32 will move the upper end of counterbore 58 longitudinally away from the upper face of ball race 42 a sufficient distance to permit spring leaves 50, 50 to expand and reduce the pressure of the race upon balls 49. The micrometer head is then in unlocked position. Sufficient clearance above the upper end of screw 32 within counterbore 58 is then provided for race 42 to be allowed to be moved upward by radial outward movement of balls 49 against the pressure of springs 50, 50 when the balls are radially disengaged from groove 29. Spring leaves 50, 50, however, are permitted to remain very slightly compressed so that balls 49 are urged slightly against rod 14. The diameter of standard rod 14 is selected such that balls 49 are slidingly retained between rod 14 and the sidewall of counterbore 36 when the balls are not engaged with groove 29, as best shown in FIGURES 5 and 6.

In operation, with the device assembled, thumbscrew 28 released, the micrometer set to a zero reading, and micrometer head 30 in unlocked position, micrometer 20 and connected micrometer head 30 are moved longitudinally along rod 14 until balls 49, under partial pressure from springs 50, 50, engage a groove 29 selected by the operator at a height such that scriber 27 lies slightly above the object the height of which is to be measured. Cap nut 54 is then rotated to locked position, thereby completely compressing springs 50, 50 against race 42 and causing sloped face 46 of the race to force balls 49 radially inward to simultaneously engage such groove 29 about its circumference, as best shown in FIGURES 3 and 4. The micrometer head is thus securely engaged with the groove at a plurality of points about the entire circumference of the groove.

Carrier member 24 bearing scriber 27 may be adjusted upward or downward by rotation of thimble 34 to measure the height of an object above lower surface 11 of base 10, and a reading may be obtained from the graduations of the micrometer in the conventional manner. By engaging thumbscrew 28, accidental further movement of the micrometer may be prevented. By subtracting the observed micrometer reading from the known height of the engaged groove 29 above lower surface 11 of base 10, the operator can precisely determine the height of the object measured above surface 11.

When it is desired to disengage micrometer head 30 from such groove 29, cap nut 54 is rotated 180 degrees, partially unthreading same from screw 32, until screw 64 strikes the end of slot 47, preventing further rotation of the cap nut, thus permitting expansion of springs 50, 50 and providing space for upward movement of race 42. When thumbscrew 28 has been released, balls 49 may be easily and simultaneously forced radially outward against the slight residual pressure of springs 50, 50 and disengaged from such groove 29 by pressure of the arcuate sidewall of the groove when the balls are forced against the sidewall of the groove by manual longitudinal sliding movement of head 30 upon rod 14.

What is claimed is:
1. In combination with a measuring instrument slidably surrounding a cylindrical supporting rod having a circumferential groove with an arcuate sidewall therein, an instrument head comprising, a threaded sleeve con- nected to said instrument at one end thereof and having an annular seat therein slidably surrounding said rod, an annular thrust washer seated within said sleeve and slidably surrounding said rod, a plurality of balls disposed within said sleeve surrounding said rod and in contact with the face of said washer not in contact with said seat, an annular ball race slidably surrounding said rod and having a lower race face sloped inwardly toward said rod and away from said balls and in contact with said balls to urge said balls against said washer and rod when said race is urged against said balls, annular spring means disposed within said sleeve and surrounding said rod to yieldingly urge said race against said balls, an annular cap nut having a recess therein threadably engaging said sleeve and slidably surrounding said rod to retain said race, balls, washer and spring means, to engage said balls radially with said groove simultaneously at a plurality of points about the circumference of said groove and along axes disposed at right angles and radial to said supporting rod when said groove is disposed within the plane of said balls, and to disengage said balls radially from said groove by contact of said arcuate sidewall therewith upon longitudinal movement of said balls with respect to said rod, said cap nut being arrangeable by rotary movement in one direction to fully compress said spring means against said race to securely retain said balls in engagement with said groove and by rotary movement in the opposite direction to reduce compression of said spring against said race to allow said balls to be disengaged from said groove.

2. The device of claim 1 having a screw threadably engaged in an eccentric longitudinal bore in said cap and directed into and received by an arcuate recess in said sleeve to limit rotary movement of said cap in said opposite direction and to prevent accidental disassembly of said instrument head.

UNITED STATES PATENTS

| | | | |
|---|---|---|---|
| 1,655,239 | 1/28 | Priputnevich | 33—165 |
| 2,135,861 | 11/38 | Thompson. | |
| 2,590,455 | 3/52 | Pittenger | 33—170 |
| 2,926,020 | 2/60 | Dayton | 279—75 |

OTHER REFERENCES

"Product Engineering," Feb. 8, 1960, page 63, Design File, "Adjustment Locks."

ISAAC LISANN, *Primary Examiner.*

ROBERT L. EVANS, *Examiner.*